(12) United States Patent
Hofmann et al.

(10) Patent No.: US 8,007,185 B2
(45) Date of Patent: Aug. 30, 2011

(54) RADIAL ROLLING BEARING

(75) Inventors: Heinrich Hofmann, Schweinfurt (DE);
Horst Doppling, Herzogenaurach (DE);
Georg Goppelt, Pfofeld (DE)

(73) Assignee: Schaeffler KG, Herzogenaurach (DE)

( * ) Notice: Subject to any disclaimer, the term of this patent is extended or adjusted under 35 U.S.C. 154(b) by 588 days.

(21) Appl. No.: 12/158,774

(22) PCT Filed: Dec. 9, 2006

(86) PCT No.: PCT/DE2006/002192
§ 371 (c)(1),
(2), (4) Date: Aug. 27, 2008

(87) PCT Pub. No.: WO2007/076771
PCT Pub. Date: Jul. 12, 2007

(65) Prior Publication Data
US 2009/0097793 A1 Apr. 16, 2009

(30) Foreign Application Priority Data

Dec. 23, 2005 (DE) .......................... 10 2005 061 792

(51) Int. Cl.
*F16C 33/30* (2006.01)
*F16C 43/06* (2006.01)
(52) U.S. Cl. ......... 384/568; 384/491; 384/510; 384/567
(58) Field of Classification Search .................. 384/450, 384/491, 523, 533, 558, 460, 567–568, 574, 384/510; 29/898.063, 898.066
See application file for complete search history.

(56) References Cited

U.S. PATENT DOCUMENTS

| 1,301,527 A | * | 4/1919 | Weibull | 384/560 |
| 1,766,440 A | * | 6/1930 | Leon | 384/558 |
| 3,020,106 A | * | 2/1962 | Mims | 384/568 |
| 4,741,632 A | * | 5/1988 | Jacobson | 384/567 |
| 6,575,631 B2 | * | 6/2003 | Shoda et al. | 384/619 |
| 2005/0117827 A1 | * | 6/2005 | Fujii et al. | 384/510 |

FOREIGN PATENT DOCUMENTS

| AT | 88 755 A | | 6/1922 |
| DE | 151 483 C | | 5/1904 |
| DE | 168 499 C | | 3/1906 |
| DE | 24 07 477 A1 | | 8/1975 |
| DE | 43 34 195 A | | 3/1994 |
| DE | 10 2005 014 556.6 A1 | | 10/2006 |
| DE | 102006060680 A1 | * | 6/2008 |
| JP | 11 264413 A | | 9/1999 |

* cited by examiner

*Primary Examiner* — Marcus Charles
(74) *Attorney, Agent, or Firm* — Lucas & Mercanti, LLP

(57) ABSTRACT

The radial rolling bearing has an outer bearing ring, an inner bearing ring, and spherical rollers arranged between bearing rings. The spherical rollers have two flat side faces arranged parallel to one another. The spherical rollers are retained with uniform spacing to one another in the peripheral direction by a bearing cage. The spherical rollers have a width between their side faces of approximately 70% of the diameter of their spherical basic shape. The running faces of the rollers roll in two groove-shaped raceways which are formed in the inner side of the outer bearing ring and in the outer side of the inner bearing ring. At least one of the axial rims which delimit the groove-shaped raceways is reduced in radial height such that the radial bearing can be equipped with an increased number of spherical rollers in an axial assembly process.

9 Claims, 3 Drawing Sheets

RADIAL ROLLING BEARING

FIELD OF THE INVENTION

The invention relates to radial rolling bearings, particularly single-row spherical-roller bearings which are used, for example, as fixed bearings for the drive and output shafts of a motor vehicle gear-shift transmission.

BACKGROUND OF THE INVENTION

It is generally known to a person skilled in the art of rolling bearings that single-row grooved ball bearings are rigid undismantable radial rolling bearings which are distinguished, above all, in that their radial and axial load-bearing capacity is equally high, and in that, because of their low friction, they have the highest rotational speed limits of all types of bearing. These grooved ball bearings have been known for a long time and consist essentially of an outer bearing ring and of an inner bearing ring and also of a number of balls arranged as rolling bodies between the bearing rings. The inside of the outer bearing ring and the outside of the inner bearing ring each have incorporated into them groove-shaped ball raceways in which the balls are guided at uniform distances from one another by means of a bearing cage. Radial ball bearings are filled in this context with the balls by means of the eccentric mounting method which became known from DE 168 499 and in which the two bearing rings are arranged eccentrically to one another and the free space occurring as a result between the bearing rings is filled with the balls. The size and number of the balls are in each case dimensioned according to the bearing size such that the inner bearing ring, between the first and the last ball, can be brought, utilizing the elasticity of the two bearing rings, into the position concentric to the outer bearing ring, so that the balls can finally be distributed at a uniform distance from one another on the reference circle of the two ball raceways and the bearing cage can be inserted.

It has been shown in practice, however, that grooved ball bearings of this type are nevertheless subject to limits with regard to the load-bearing capacity of the bearing because of the low maximum number of balls which can be installed, which is dependent on the dimensions of the inner and of the outer bearing ring and on the ball diameter. In the past, therefore, a multiplicity of solutions, such as, for example, an unclosed filling orifice arranged in the mutually opposite rims of the outer and of the inner bearing ring, according to DE 151 483, or a similarly designed closable filling orifice, according to DE 24 07 477 A1, were proposed, by means of which an increase in the load-bearing capacity of grooved ball bearings was to be achieved by an increase in the number of balls. Such filling orifices, even in the closed version, have the disadvantage, however, that, on account of their wedge-shaped issue into the raceways of the balls or due to burrs, a "catching" or jamming of the rolling bodies at this filling orifice may occur, and therefore it was not possible for such solutions to gain acceptance in practice.

Furthermore, another possibility for increasing the number of rolling bodies on a radial rolling bearing became known from DE 43 34 195 A1. In this radial rolling bearing, designed per se as a single-roll grooved ball bearing, however, the rolling bodies are not formed by balls, but by what are known as spherical rollers which are designed with two side faces flattened symmetrically from a basic spherical shape and arranged parallel to one another. The width of these spherical rollers between their side faces is in this case designed to be smaller than the distance between the inside of the outer bearing ring and the outside of the inner bearing ring, so that the filling of the bearing with the spherical rollers can take place by what is known as the axial mounting method, in which the spherical rollers are introduced axially through the clearance between the inner ring and outer ring into the bearing. When the center point of the spherical rollers is then level with the rolling body raceway axis, the spherical disks are rotated by 90°, so that they can roll with their spherical running surfaces in the rolling body raceways.

However, in spite of the possibility of inserting these specially designed spherical rollers axially into the bearing and of consequently being able to fill the radial rolling bearing virtually completely with a large number of rolling bodies, such a radial rolling bearing constitutes, at most, merely a compromise in terms of the desired increase in the load-bearing capacity of the bearing. This is based on the fact that the spherical rollers, because of their ability to be introduced axially into the bearing, can be designed to be only correspondingly narrow or with a correspondingly small width between their side faces, so that they can be introduced easily through the clearance between the inner ring and outer ring into the bearing. The rolling body raceways in the bearing rings can likewise be designed to be only relatively shallow and narrow in order to make it possible for the rolling bodies to rotate into their operating position, without too high a radial play occurring in the overall bearing in this operating position. However, the relatively narrow spherical rollers and the shallow rolling body raceways give rise to a relatively small contact surface of the spherical rollers with their rolling body raceways, so that both the axial and the radial load-bearing capacity of such a radial bearing are again reduced and the original advantage of the increased number of rolling bodies is virtually compensated.

To avoid these disadvantages, therefore, it was proposed by the German patent application with file number 10 2005 014 556.6, not yet published at the time of filing of the present patent application, to increase the width of the spherical rollers between their side faces to at least 70% of the diameter of their basic spherical shape and to design the groove-shaped rolling body raceways in the bearing rings with a depth of between 17% and 19% and a width of between 75% and 78% of the diameter of the basic spherical shape of the spherical rollers, since this gives rise to an overall contact surface of the spherical rollers with their raceways of about 45% of the circumference of the basic spherical shape of the spherical rollers which the balls of conventional grooved ball bearings also have with their raceways in the bearing rings. However, since the clearance between the rims, delimiting the rolling body raceways, of the inner and of the outer bearing ring thereby becomes smaller than the width of the spherical rollers, it is possible to insert them into the radial rolling bearing solely by the eccentric mounting method in which the spherical rollers, bearing with their side faces one against the other, are introduced into the free space between the two bearing rings arranged eccentrically to one another, transversely into the rolling body raceways. However, the flattened side faces of the spherical rollers in this case make it possible that an increased number of rolling bodies, as compared with single-row grooved ball bearings, can also be mounted in the bearing by means of the eccentric mounting method. After the filling of the bearing with the spherical rollers, the inner bearing ring is then brought into the position concentric to the outer bearing ring, so that the spherical rollers can be distributed at a uniform distance from one another on the reference circle of their raceways and be pivoted by 90°, and, finally, the bearing cage can be inserted into the bearing.

What was achieved by means of a spherical roller bearing designed in this way was that the spherical rollers have large contact surfaces with their raceways in the bearing rings in similar way to the balls of a grooved ball bearing, and that the bearing can be equipped with a higher number of rolling bodies than conventional single-row grooved ball bearings, but, because of the eccentric mounting method, cutbacks had to be made in terms of the number of rolling bodies, as compared with the higher number of rolling bodies possible in the axial mounting method. Thus, as compared with conventional grooved ball bearings, although the axial construction space and the weight of the bearing could be reduced and its axial load-bearing capacity increased, the increase in the axial and the radial load-bearing capacity of the bearing was nevertheless comparatively slight.

OBJECT OF THE INVENTION

Proceeding from the presented disadvantages of the solutions of the known prior art, therefore, the object on which the invention is based is to design a radial rolling bearing, in particular a single-row spherical-roller bearing, in which, to achieve large contact surfaces with their raceways in the bearing rings, the spherical rollers have both an enlarged width, possible by virtue of the eccentric mounting method, and, to increase the load-bearing capacity of the bearing, a higher number which is achievable by means of the axial mounting method.

DESCRIPTION OF THE INVENTION

According to the invention, this object is achieved in that at least one of the axial rims delimiting the groove-shaped raceways in the bearing rings is designed to be reduced in its radial height in such a way that the radial bearing can be equipped with an increased number of spherical rollers by the axial mounting method via the enlarged clearance of this rim with respect to the radially opposite rim.

Preferred refinements and developments of the radial rolling bearing designed according to the invention are described in the subclaims.

Thus, in a particularly preferred embodiment of the radial rolling bearing designed according to the invention, there is provision for one of the two rims delimiting the raceway in the outside of the inner bearing ring to he designed with reduced height, since this has proved to be more advantageous in the mounting of the spherical rollers, as compared with the reduction in height of one of the rims on the outer bearing ring.

On the basis of this, the radial rolling bearing designed according to the invention is consequently distinguished in that the depth of the raceway in the inner bearing ring amounts, as compared with the rim not of reduced height, to about 20% and, as compared with the rim of reduced height, to about 12% of the diameter of the basic spherical shape of the spherical rollers, while the depth of the raceway in the inside of the outer bearing ring amounts, as compared with its rims, on both sides to about 17% of the diameter of the basic spherical shape of the spherical rollers. The design of the rolling body raceways with such dimensions corresponds in this case to the experimental values proven in conventional grooved ball bearings and ensures that, depending on the radial bearing play, spherical rollers have a high degree of osculation with their raceways, even in the case of a permissible skewing of the bearing of 8 to 16 angular minutes out of the center position, and the bearing thus maintains the full load-bearing capacity.

Finally, the preferred embodiment of the radial rolling hearing designed according to the invention also has the features that one rim of the raceway in the outer bearing ring has a clearance of about 63% of the diameter of the basic spherical shape of the spherical rollers with respect to the radially opposite rim not of reduced height of the raceway in the inner hearing ring, while the clearance of the other rim of the raceway in the outer bearing ring with respect to the radially opposite rim of reduced height of the raceway in the inner bearing ring amounts to about 71% of the diameter of the basic spherical shape of the spherical rollers. Since the spherical rollers have between their side faces a distance of 70% of the diameter of the basic spherical shape of the spherical rollers, it is therefore possible without difficulty to introduce these from the bearing side having a greater distance through between the rims axially into the bearing and then pivot them by 90.degree. into their operating position. At the same time, the raceways, sufficiently deep on account of said clearances, of the spherical rollers and their high rims ensure that the spherical rollers have a large contact surface with their raceways which increases the radial load-bearing capacity of the hearing, the axial load-bearing capacity of the bearing in the direction of the rim of reduced height being slightly restricted.

Furthermore, as an alternative embodiment of the radial rolling bearing designed according to the invention, it is proposed also to form, in addition to the rim of reduced height on the inner bearing ring, a diagonally opposite rim of reduced height on the outer bearing ring. According to claims 8 and 9, in this embodiment, the depth of the raceway in the outer bearing ring amounts, as compared with the rim not of reduced height, to about 17% and, as compared with the rim of reduced height, to about 9% of the diameter of the basic spherical shape of the spherical rollers, and the two rims of the raceway in the outer bearing ring have in each case clearances of about 71% of the diameter of the basic spherical shape of the spherical rollers with respect to the radially opposite rims of the raceway in the inner bearing ring. Such an embodiment may be advantageous, particularly in such cases, when the axial forces occurring during the operation of the bearing act mainly only in the direction in which the raceways of the bearing rings are delimited by rims not of reduced height. The main advantage of this embodiment, however, is that the spherical rollers can be introduced into the spherical-roller hearing from both axial sides of the bearing, since the clearances of the radially opposite rims of the two bearing rings are in each case larger than the distance between the side faces of the spherical rollers.

The spherical-roller bearing designed according to the invention thus has the advantage, as compared with the spherical-roller bearings known from the prior art, that it is now possible, by means of at least one rim, designed with a reduced height, of a raceway in one of the bearing rings, to insert into the bearing, also by the axial mounting method, the spherical rollers hitherto mountable only by the eccentric mounting method and having a width of 70% of the diameter of their basic spherical shape and large contact surfaces with raceways of wide design, so that the number of these spherical rollers can be increased even further, as compared with the number of spherical rollers possible in the eccentric mounting method. As a result, the radial rolling bearing designed according to the invention unites within it the advantages of known spherical-roller bearings, as compared with conventional single-row grooved ball bearings, to be precise a reduced axial construction space, reduced weight and an increased number of rolling bodies, and the advantages of spherical-roller bearings assembled by the eccentric mounting method, as compared with other known spherical-roller bearings, to be precise large contact surfaces between the rolling bodies and their raceways and high axial load-bearing capacity, so that, overall, a markedly increased radial and axial load-bearing capacity of the spherical-roller bearing according to the invention, as compared with both known types of bearing, is obtained.

BRIEF DESCRIPTION OF THE DRAWINGS

Two preferred embodiments of the radial rolling bearing designed according to the invention are explained in more detail below with reference to the accompanying drawings in which.

DETAILED DESCRIPTION OF THE DRAWINGS

Figure 1:
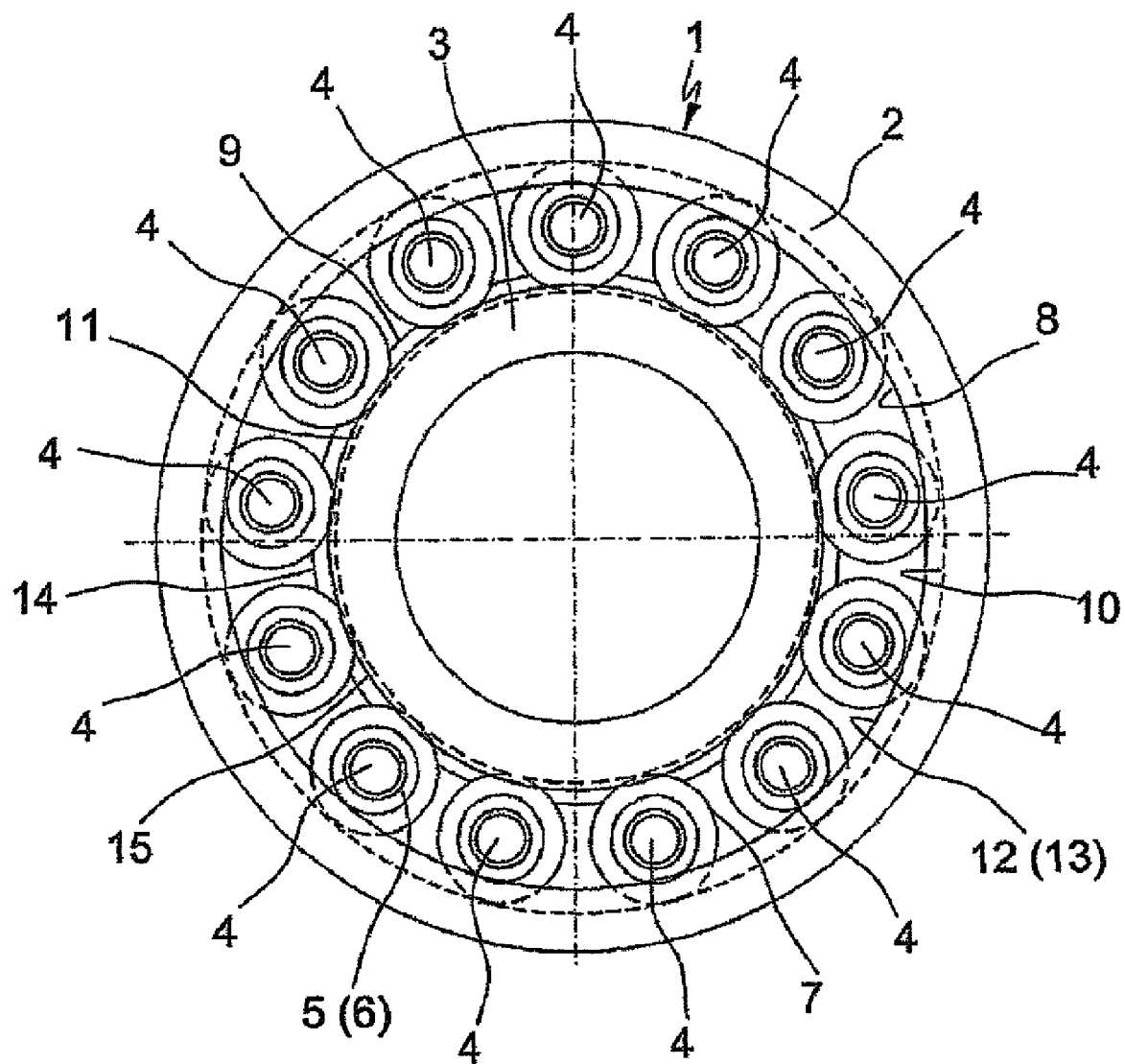
FIG. 1 shows an enlarged illustration of a front view of a spherical-roller bearing designed according to the invention without a bearing cage.
Figure 2:
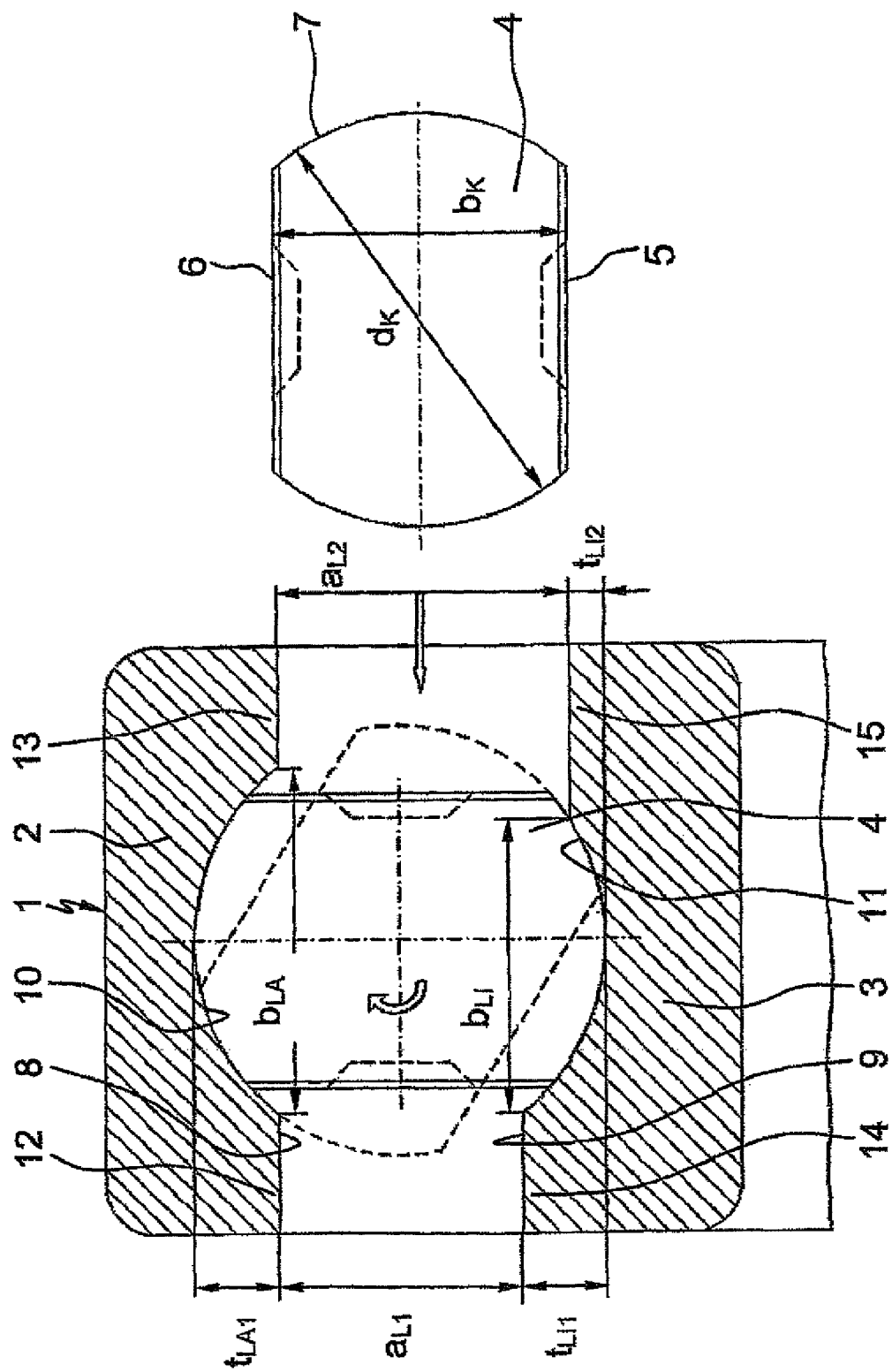
FIG. 2 shows an enlarged illustration of a cross section through a first embodiment of a spherical-roller bearing designed according to the invention.

A radial rolling bearing 1 designed as a single-row spherical-roller bearing is clearly apparent from FIG. 1 and consists essentially of an outer bearing ring 2 and an inner bearing ring 3 and also of a multiplicity of spherical rollers 4 which are arranged between these bearing rings 2, 3 and which, as is clear in FIG. 2, in each case have two side faces 5, 6 flattened symmetrically from a basic spherical shape and arranged parallel to one another and are held at uniform distances from one another in a circumferential direction by means of a bearing cage, not illustrated. As can likewise be seen clearly in FIG. 2, these spherical rollers 4 have between their side faces 5, 6 a width $b_K$ of about 70% of the diameter $d_K$ of their basic spherical shape and roll with their running surfaces 7 in two groove-shaped raceways 10, 11 which are incorporated into the inside 8 of the outer bearing ring 2 and into the outside 9 of the inner bearing ring 3 and which are each delimited by two axial rims 12, 13 and 14, 15 and have a depth $t_{LA}$, $t_{LI}$ and a width $b_{LA}$, $b_{LI}$, by means of which the overall contact surface of the spherical rollers 4 with their raceways 10, 11 amounts to about 45% of the circumference of the basic spherical shape of the spherical rollers 4.

In order further to increase the load-bearing capacity of the radial bearing 1 by means of spherical rollers 4 designed in this way, it is proposed, according to the invention, that, as illustrated in FIG. 2, the axial rim 15 delimiting the groove-shaped raceway 11 in the inner bearing ring 3 be designed so as to be reduced in its radial height in such a way that the radial bearing 1 can be equipped with an increased number of spherical rollers 4 by the axial mounting method via the enlarged clearance $a_{L2}$ of this rim 15 with respect to the radially opposite rim 13 of the outer bearing ring 2.

This is advantageously implemented, to achieve a high degree of osculation of the spherical rollers 4 with their raceways 10, 11, in such a way that, as indicated in FIG. 2, the depth $t_{LI1}$ of the raceway 11 in the inner bearing ring 3 is designed, as compared with the rim 14 not of reduced height, with about 20% and its depth $t_{LI2}$ is designed, as compared with the rim 15 of reduced height, with about 12% of the diameter $d_K$ of the basic spherical shape of the spherical rollers 4. It is likewise indicated in FIG. 2 by dimension arrows that the depth $t_{LA1}$ of the raceway 10 in the inside 8 of the outer bearing ring 2, as compared with its rims 12, 13, amounts in this case unchanged, to about 17% of the diameter $d_K$ of the basic spherical shape of the spherical rollers 4 and therefore corresponds to the design of the raceways on conventional single-row grooved ball bearings.

As FIG. 2 further shows, however, the result of the design with a different height of the rims 12, 13 and 14, 15 on the two bearing rings 2, 3 is that one rim 12 of the raceway 10 in the outer bearing ring 2 has a clearance $a_{L1}$ of about 63% of the diameter $d_K$ of the basic spherical shape of the spherical rollers 4 with respect to the radially opposite rim 14 not of reduced height of the raceway 11 in the inner bearing ring 3, while the other rim 13 of the raceway 10 in the outer bearing ring 2 has a clearance $a_{L2}$ of about 71% of the diameter $d_K$ of the basic spherical shape of the spherical rollers 4 with respect to the radially opposite rim 15 of reduced height of the raceway 11 in the inner bearing ring 3. Since the spherical rollers 4 have between their side faces 5, 6 a distance of 70% of the diameter of their basic spherical shape, it is therefore possible without difficulty to introduce these from the bearing side having the clearance $a_{L2}$ of 71% between the rims 13, 15 axially into the radial bearing 1 and then, as indicated in FIG. 2 by movement arrows and by an intermediate position illustrated by dashes, to pivot them by 90° into their operating position.

Figure 3:
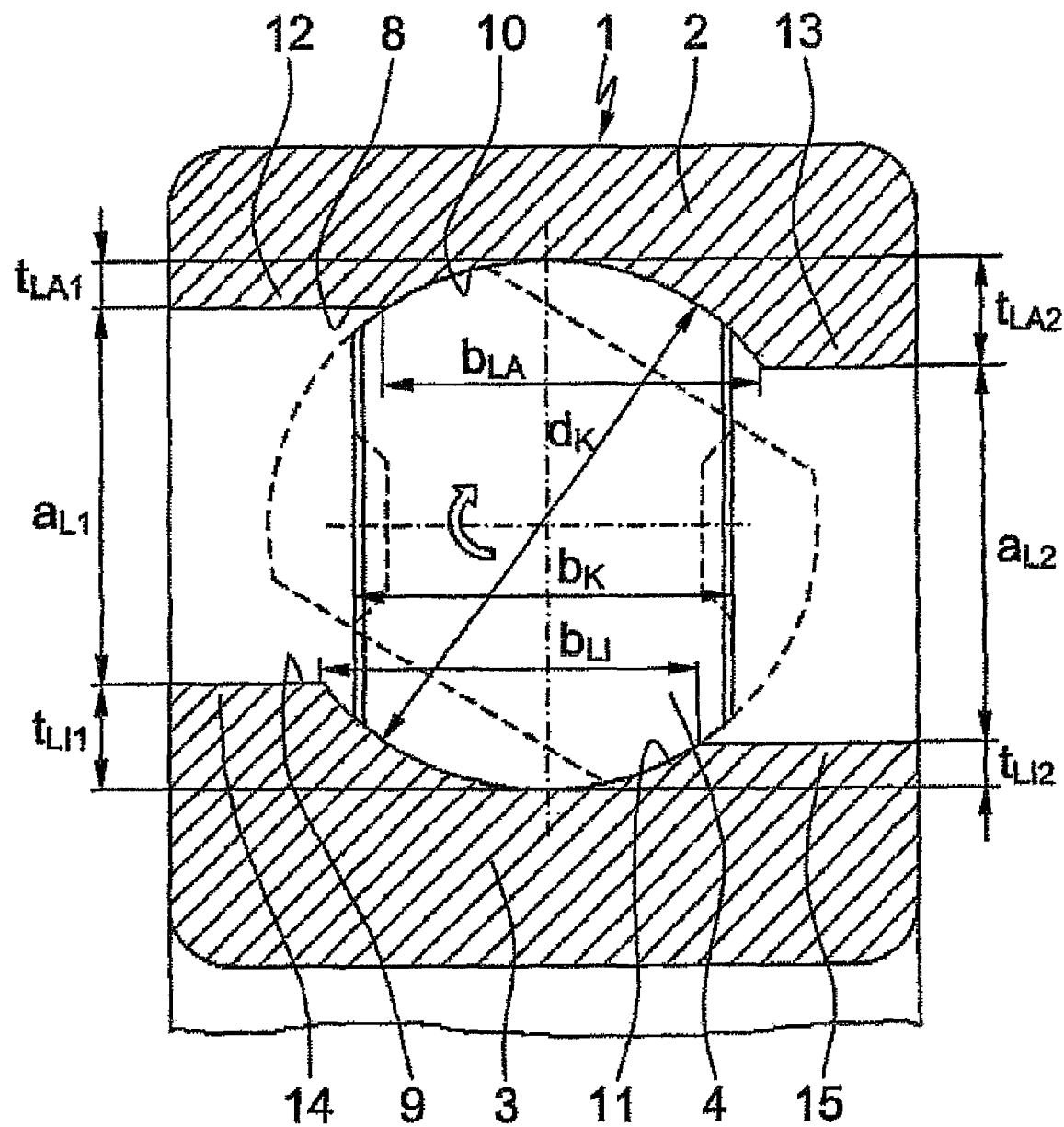
FIG. 3 shows an enlargement of a cross section through a second embodiment of a spherical-roller bearing designed according to the invention.

Finally, a second embodiment of a radial bearing 1 designed according to the invention may be gathered from FIG. 3, in which, in addition to the rim 15 of reduced height, described in the first embodiment, on the inner bearing ring 3, a rim 12 arranged diagonally opposite is also designed with a reduced height on the outer bearing ring 3. In this embodiment, the depth $t_{LA1}$ of the raceway 10 in the outer bearing ring 2 amounts, as compared with the rim 12 with reduced height, to about 9% and its depth $t_{LA2}$ amounts, as compared with the rim not of reduced height, to about 12% of the diameter $d_K$ of the basic spherical shape of the spherical rollers 4, so that the two rims 12, 13 of the raceway 10 in the outer bearing ring 2 have in each case clearances of about 71% of the diameter $d_K$ of the basic spherical shape of the spherical rollers 4 with respect to the radially opposite rims 14, 15 of the raceway 11 in the inner bearing ring 3. Such an embodiment can be employed when the axial forces occurring during the operation of the bearing act mainly in the direction of the rims 13, 14 not of reduced height of the bearing rings 2, 3, and has proved to be advantageous in that the spherical rollers 4 can be introduced into the radial bearing 1 from both axial sides.

LIST OF REFERENCE NUMERALS

1 Radial rolling bearing
2 Outer bearing ring
3 Inner bearing ring
4 Spherical rollers
5 Side face of 4
6 Side face of 4
7 Running surface of 4
8 Inside of 2
9 Outside of 3
10 Raceway in 8
11 Raceway in 9
12 Rim of 10
13 Rim of 10
14 Rim of 11
15 Rim of 11
$b_K$ Width of 4
$d_K$ Diameter of the basic spherical shape of 4

$t_{LA1}$ Depth of 10
$t_{LA2}$ Depth of 10
$t_{LI1}$ Depth of 33
$t_{LI2}$ Depth of 11
$b_{LA}$ Width of 10
$b_{LI}$ Width of 11
$a_{L1}$ Clearance between 12 and 14
$a_{L2}$ Clearance between 13 and 15

The invention claimed is:

1. A radial rolling bearing, comprising:
    an outer bearing ring having an inner face with a groove-shaped raceway incorporated into the inside face that has a depth and a width and is delimited by two linearly parallel axial rims;
    an inner bearing ring having an outer face with a groove-shaped raceway incorporated into the inside face that has a depth and a width and is delimited by two linearly parallel axial rims; and
    spherical rollers arranged between the bearing rings, the spherical rollers each have two side faces flattened symmetrically from a basic spherical shape, are arranged parallel to one another and are held at uniform distances from one another in a circumferential direction, the spherical rollers having between the side faces a width of about 70% of a diameter of the basic spherical shape and rolling with running surfaces in the raceways with an overall contact surface of the spherical rollers with the raceways amounting to about 45% of a circumference of the basic spherical shape of the spherical rollers,
    wherein at least one of axial rim of at least one of the bearing rings has a reduced radial height such that the radial bearing can be equipped with an increased number of the spherical rollers by an axial mounting via an enlarged clearance provided by the axial rim which has reduced radial height.

2. The radial rolling bearing as claimed in claim 1, wherein one of the rims delimiting the raceway in the outside of the inner bearing ring is designed with reduced height.

3. The radial rolling bearing as claimed in claim 2, wherein the depth of the raceway in the inner bearing ring amounts, as compared with the rim not of reduced height, to about 20% and its depth amounts, as compared with the rim of reduced height, to about 12% of the diameter of the basic spherical shape of the spherical rollers.

4. The radial rolling bearing as claimed in claim 3, wherein the depth of the raceway in the inside of the outer bearing ring amounts, as compared with its rims, to about 17% of the diameter of the basic spherical shape of the spherical rollers.

5. The radial rolling bearing as claimed in claim 4, wherein one rim of the raceway in the outer bearing ring has a clearance of about 63% of the diameter of the basic spherical shape of the spherical rollers with respect to the radially opposite rim not of reduced height of the raceway in the inner bearing ring.

6. The radial rolling bearing as claimed in claim 4, wherein the other rim of the raceway in the outer bearing ring has a clearance of about 71% of the diameter of the basic spherical shape of the spherical rollers with respect to the radially opposite rim of reduced height of the raceway in the inner bearing ring.

7. The radial rolling bearing as claimed in claim 3, wherein, in addition to the rim of reduced height on the inner bearing ring, a rim arranged diagonally opposite is formed with reduced height on the outer bearing ring.

8. The radial rolling bearing as claimed in claim 7, wherein the depth of the raceway in the outer bearing ring amounts, as compared with the rim of reduced height, to about 9% and its depth amounts, as compared with the rim not of reduced height, to about 17% of the diameter of the basic spherical shape of the spherical rollers.

9. The radial rolling bearing as claimed in claim 8, wherein the two rims of the raceway in the outer bearing ring have in each case clearances of about 71% of the diameter of the basic spherical shape of the spherical rollers with respect to the radially opposite rims of the raceway in the inner bearing ring.

* * * * *